United States Patent Office 2,924,751
Patented Feb. 9, 1960

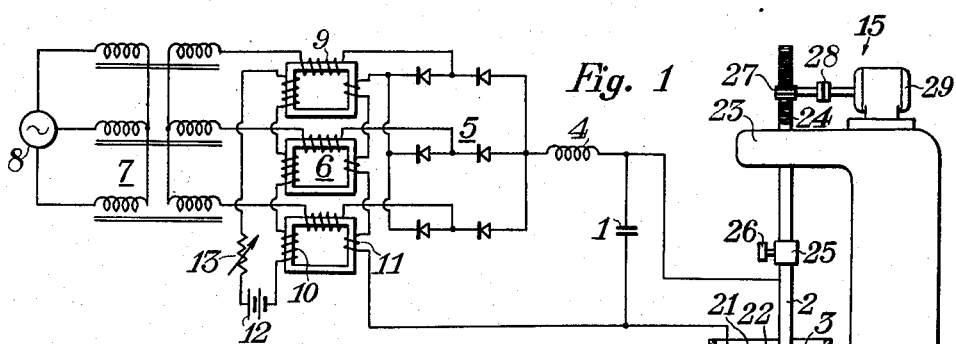
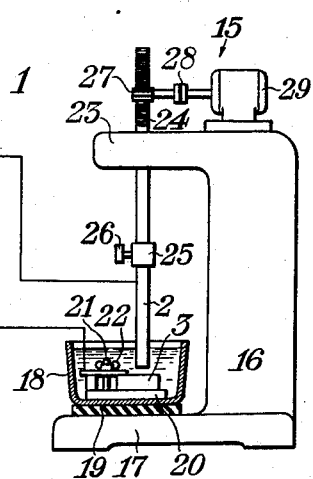
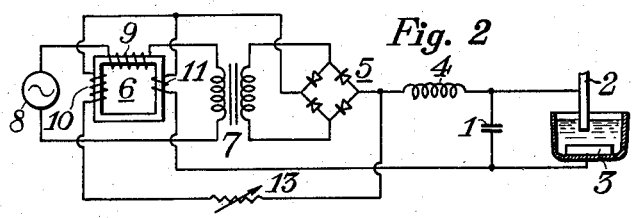
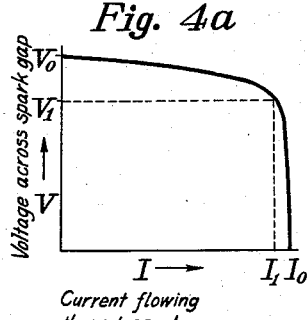
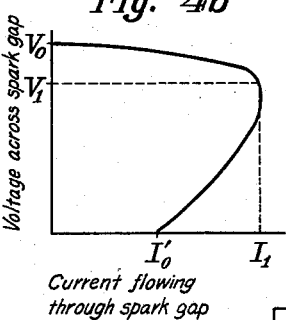
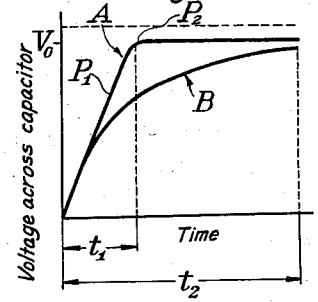
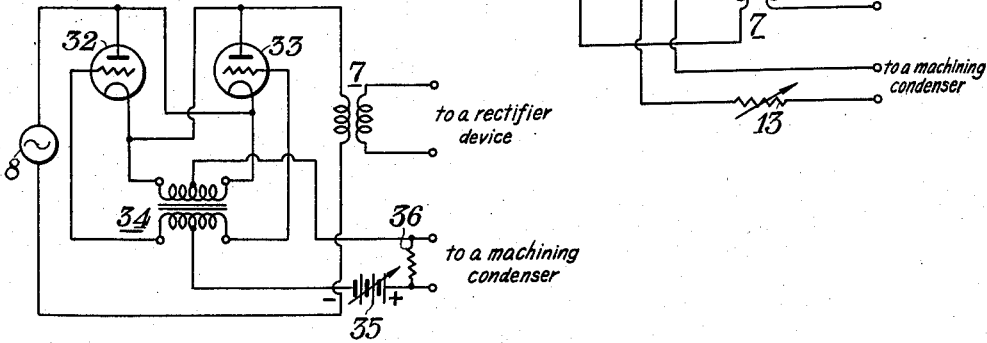

2,924,751

ELECTRIC SPARK MACHINING APPARATUS

Kiyoshi Inoue, Tokyo, Japan

Application January 31, 1958, Serial No. 712,349

Claims priority, application Japan February 7, 1957

5 Claims. (Cl. 315—241)

This invention relates generally to an electric spark machining apparatus using a capacitor, and more particularly to an automatic voltage control system for automatically controlling a direct current voltage with which the capacitor is supplied to be charged.

It has already been known that a metallic workpiece can be perforated or cut by placing the same and a tool as electrode very close thereto within a dielectric fluid and utilizing electric discharges in the form of impulse repeatedly occurring between the workpiece and the electrode-tool caused by dielectric breakdown of the fluid therebetween. This process is sometimes referred to as electric spark machining.

The simplest form of a device for generating such discharges may comprise a capacitor having one terminal thereof connected to the workpiece and the other terminal thereof to the electrode-tool, said capacitor being adapted to be charged from a source of direct current voltage through a resistor. Namely, it may include a so-called R–C network. If a voltage developed across the capacitor as charged will reach a predetermined value a dielectric fluid between the workpiece and the electrode-tool will electrically be broken down thereby to generate an electric spark discharge therebetween. The discharge has a very short duration and after its termination, the capacitor will again be charged.

Since, in the R–C network, the voltage across the capacitor as charged is exponentially increased with time a period of time required to increase the voltage to a certain value is longer as compared with a circuit in which the voltage is linearly increased to that value. Accordingly, a rate of repetition of electric discharge will be reduced and a machining speed may not be increased. In order to increase the rate of repetition of discharge, the magnitude of the resistor in the R–C network may be decreased. However, the resistor should have a lower limit of resistance because its resistance reduced below a certain value will bring about a danger of converting the generated electric discharge into an "arc discharge." The term "arc discharge" used in the specification means any electric discharge having a duration exceeding about one millisecond.

To reduce the capacitor-charging time, a L–R–C network has been proposed. This network comprises an inductance serially inserted in an R–C network as above described except that a resistor included has a reduced resistance. The inductance serves to store a portion of electric energy at the beginning of each charging period and to impart the stored energy to the capacitor when the charging current is decreased. This results in rapid increase in the voltage across the capacitor and hence in decrease in the charging period.

Even, in such a network, the resistance, however, may be decreased only by a few percent of that in the R–C network explained previously. Also, a large increase in the rate of repetition of electric discharge cannot be expected. The reason for this is as follows: Since a charging voltage is constant any reduction in the resistance leads to an increase in the charging current at the beginning of the charging period and hence in the energy stored in the inductance. In this case, the stored energy has not only its portion increasing rapidly the voltage across the capacitor, but also is delivered to a spark gap between the electrode-tool and the workpiece during the discharge period. This delivered energy tends to greatly damage the machined surface of the workpiece.

In known charging circuits including the networks as previously described, factors for determining capacitor-charging characteristic, that is, magnitudes of charging voltage and resistance are fixed. If it would be desired to increase the rate of repetition of electric discharge in such circuits, the capacitors should be charged at lower voltages. This will result in decrease in electric energy of each discharge and consequently the machining speed may not be increased. Furthermore, in these charging circuits, an average machining voltage across the spark gap is inversely proportional to an average machining current flowing therethrough. Accordingly, the average current will be maximum as the spark gap would be short-circuited. In this case, separation of the electrode-tool from the workpiece will readily produce an arc discharge therebetween. The higher the inductance in the charging circuit will become the more readily the arc discharge may occur.

The charging circuit referred to comprises the series resistor through which a current substantially equal to 65% of the shortcircuited current flows even when the workpiece is subjected to good machining with the maximum efficiency or when the average machining voltage is of the order of 45% of a voltage to which the capacitor may be charged. Accordingly, about 50% of electric power is dissipated as heat loss and the electric power is very uneconomically utilized.

In the electric spark machining, the use of a constant rate at which a capacitor is charged tends to convert electric discharge produced between a workpiece and an electrode-tool into an arc discharge. As previously pointed out, this will bring about a danger of damaging the machined surface of the workpiece. Since the occurrence of the arc discharge should completely be avoided, it is required to control the charging rate in accordance with machining conditions depending upon the configuration of the workpiece to be machined. In this case, an automatic control is preferable.

A principal object of the invention, therefore, is to provide an electric spark machining apparatus of the type described in which a capacitor-charging rate can automatically be controlled in accordance with machining conditions whereby the occurrence of arc discharge is perfectly prevented.

An object of the invention is to provide an electric spark machining apparatus of the type described having a high machining speed obtained by extremely increasing a rate of repetition of electric discharge without any change in electric energy of discharge.

Another object of the invention is to provide an electric spark machining apparatus of the type described in which a current flowing through a spark gap between a workpiece and an electrode-tool as the gap would be short-circuited is substantially equal to or very smaller than an average machining current.

A further object of the invention is to provide an electric spark machining apparatus of the type described having an extremely low loss of electric power and a high efficiency.

A still further object of the invention is to provide an electric spark machining apparatus of the type described capable of performing finish machining operation.

According to the invention, there is provided an electric spark machining apparatus comprising a capacitor adapted to be fed from a rectifier device and to be alternately charged and impulsively discharged, and variable impedance means connected between the rectifier device and a source of alternating current, said variable impedance means being arranged to be controlled in accordance with a machining voltage and/or a machining current.

In one embodiment of the invention, said variable impedance means may comprise saturable reactor means connected between the rectifier device and the source of alternating current and including a bias winding and a control winding. The bias winding may be energized from a source of constant direct current voltage through a variable resistor thereby to control the initial impedance of said saturable reactor means. The control winding is connected serially in a circuit for charging the capacitor and adapted to control the impedance of said saturable reactor means in accordance with a machining voltage and/or a machining current. Both the windings link to said reactor means in such a way as to magnetically excite the same in the opposite directions respectively.

Alternatively, the bias winding may be connected across the direct current output of the rectifier device through a variable resistor which, in turn, may be adjusted to set the initial impedance of the saturable reactor means.

In another embodiment of the invention, said variable impedance means may comprise electrolytic capacitor of liquid type for alternating current having a variable capacitance and connected between the rectifier device and the source of alternating current. In order to control the capacitance of the electrolytic capacitor, that area of its electrode unit of one polarity in contact with its electrolyte may be varied by the action of an electromagnet including an exciting winding connected through a variable resistor across a machining capacitor for supplying electric energy to a spark gap between an electrode-tool and a workpiece. The initial capacitance of the electrolytic capacitor may be set by adjusting the variable resistor.

In another modification of the invention, said variable impedance means may comprise a pair of electron discharge devices capable of passing an alternating current therethrough required to operate the electric spark machining apparatus and connected between the rectifier device and a source of alternating current. The pair of the electron discharge devices comprises two sets of anodes coupled to the source of alternating current and the rectifier device respectively, two sets of control electrodes connected to each other through a primary winding of a compensating transformer, and two sets of cathodes connected to each other through a secondary winding of the transformer. The set of anodes of one of the pair of the electron discharge devices is connected to the set of cathodes of the other of the pair. The primary of the compensating transformer has a center tap connected to one side of a machining capacitor through a bias source having an adjustable voltage for set initially the impedance presented to the alternating current passed through each of the pair of the electron discharge device and the secondary of the transformer has a center tap connected to the other side of the machining capacitor.

According to one aspect of the invention, an inductor may be connected between the direct current output of the rectifier device and the capacitor coupled across the spark gap between the workpiece and the electrode-tool. The inductor has preferably an inductance just sufficient to prevent an amount of charge stored in the rectifier device due to the inherent capacitance thereof from being applied to the capacitor at the beginning of each of capacitor-charging periods.

The invention will be apparent from the following detailed description in conjunction with the accompanying drawings illustrating exemplary embodiments thereof in which:

Fig. 1 shows a schematically elevational view, partly in section, of an electric spark machining apparatus and a wiring diagram illustrating diagrammatically a preferred circuit embodying the invention for use in the apparatus;

Fig. 2 shows a wiring diagram illustrating diagrammatically a modification of the circuit illustrated in Fig. 1;

Fig. 3 shows graphs useful for explaining the operation of the invention;

Figs. 4a and 4b show voltage-to-current curves of electric discharge occurring across the spark gaps in the circuits illustrated in Figs. 1 and 2 respectively;

Fig. 5 shows schematically a circuit diagram of a further modification of the invention; and Fig. 6 shows schematically a circuit diagram of a still further modification of the invention.

Referring now to Fig. 1, there is shown an electric spark machining apparatus including a preferred form of a capacitor-charging circuit embodying the invention. While the apparatus is shown as being fed from a source of three phase alternating voltage, it is to be understood that the invention is not limited to the use of such a source and may, if desired, utilize a source of alternating voltage having any desired number of phases. A capacitor 1 is provided for supplying repeatedly impulses of electric energy to a spark gap formed by an electrode-tool 2 and a workpiece 3, and is adapted to be repeatedly charged by full-wave rectifier device 5 through an inductor 4. Each of the rectifiers in the devices 5 is shown as dry type rectifier such as selenium rectifier, but instead of the dry type rectifier, any type of rectifier, for example an electron discharge rectifier, may be used if desired. Also, a half-wave rectifier device may be utilized. The rectifier device 5 has an amount of charge stored therein depending upon its capacitance. The inductor 4 serves to absorb a charge as delivered from the rectifier device to the capacitor at the beginning of each of capacitor-charging periods and thereby to prevent the same from being discharged across the spark gap. Accordingly, the inductor has an inductance depending upon a ratio of the capacitance of the capacitor 1 to that of the rectifier device. In other words, the inductance is selected such that it can be just sufficient to prevent said charge from being applied to the capacitor at the beginning of each of the charging periods. If the capacitance of the capacitor 1 would be sufficiently larger than that of the device 5 inductor 4 may be dispensed with.

As illustrated in Fig. 1, a pair of the rectifiers 5 is connected with each of three feeding lines and has an input of alternating current coupled through a saturable reactor 6 to different one of the secondary windings of an insulating transformer 7. The transformer 7 comprises three primary windings supplied with electric power from a source of alternating current 8. Each of the saturable reactors 6 which are of identical type comprises an alternating current winding 9 connected between the A.C. input of the rectifier device 5 and one end of the secondary winding of the transformer 7, a bias winding 10, and a control winding 11. The bias windings 10 of three reactors 6 are connected in series to each other and arranged to be supplied with a direct current through a variable resistor 13 by a source of direct current illustrated generally by a battery 12. Similarly, the control windings 11 are connected in series to each other. The serially connected windings 11 has one end connected to one of the outputs of the rectifier device 5 and the other end connected to that terminal of the capacitor 1 remote from the inductor 4. The windings 10 and 11 link to the magnetic core of each of the saturable reactor 6 in such way as to establish respectively magnetic fluxes in the opposite directions within that core. The control winding 11 may be designed to have a number of turns substantially equal to several percent of that of the bias winding 10. It is noted that the winding 11 should have such ampere-turns that a current flowing through the same as the spark gap would be short-circuited will not reverse the resultant, magnetic state of the reactor cores.

A single block of dotted line 15 designates an electric spark machining unit to which the invention is not directed. Such a unit is disclosed for example, in the Japanese Patent No. 210,014 corresponding to the U.S. application Serial No. 256,322 filed on November 14, 1951, by E. M. Williams. The unit illustrated comprises a column 16 for carrying an electrode-tool feeding mechanism and a bed 17 upon which a vessel 18 is adapted to rest with an electrically insulating plate 19 inserted therebetween. A dielectric fluid is placed in the vessel 18 and the workpiece 3 is secured to a supporting block 20 by means of a bolt 21 and a thumbscrew 22, the block 20 being mounted to the bottom of the vessel by any suitable means.

The column 16 is provided at its upper end with a horizontal member 23 which, in turn, supports a spindle 24 for vertical movement. The spindle 24 comprises a holder 25 at its lower end for securing the electrode-tool 2 thereto by bolt 26 and is provided, on its upper portion, with a toothed rack meshing with a gear 27 capable of being rotated through a coupling 28 by a reversible motor 29 which, in turn, is secured to the horizontal member 23. With this arrangement, it will be seen that the rotation of the motor 29 in either sense can move the electrode-tool 2 upwards or downwards whereby a distance between the electrode-tool 2 and the workpiece 3 and hence the length of the spark gap can be controlled.

The operation of the apparatus described will now be explained. First, the saturable reactors 6 may be suitably magnetised by means of a direct current passing from the battery 12 via the variable resistor 13 and thence to the bias winding 10. The magnitude of this current may be varied by adjusting the variable resistor 13. Since the magnitude of the current affects the magnetized state of reactors 6 and hence their impedances the adjustment of the variable resistor 13 can change an alternating voltage applied to the rectifier device 5. In this case, the resistor 13 is set to impart to each of the reactors 6 such an initial impedance presented to an alternating current flowing through the alternating current winding 9 that the charging characteristic for the capacitor 1 has the possible highest rate of building-up so long as it will not intersect the deionization characteristic for the spark gap between the electrode-tool 2 and the workpiece 3. Each of the reactors 6 is preferably designed to have such initial impedance when it is substantially in its magnetic saturation. It is now assumed that the length of the spark gap is succesively decreased with the capacitor 1 fully charged. If the length of the spark gap would be large sufficiently to prevent an electric discharge from occurring across the gap, the voltage V across the same will be of a value $V_0$ as shown in Fig. 4a. Then the length of the spark gap will be decreased and reach an extent at which the voltage across the capacitor will permit an electric discharge to take place across the gap. At this moment, the electric discharge will be started and the charge stored in the capacitor 1 will flow into the gap. In this case the discharge tends to be followed by an electric discharge resulting from a charge stored in the rectifier device 5 by virtue of the inherent capacitance thereof. This continuation of the latter discharge will lead to the occurrence of an arc discharge which, in turn, will greatly damage the machined surface of the workpiece. According to the invention, this damage can be avoided by the inductor 4 connected between the rectifier device 5 and the capacitor 1. The inductor 4 serves to absorb said stored charge from the rectifier device 5 thereby to block the application of the same to the spark gap. Accordingly, even though the capacitor would have a relatively low capacitance the workpiece can be machined in stable state without the machined surface damaged. Also the voltage across the capacitor 1 will be reduced substantially to null voltage and the spark gap will be subjected to rapid deionization. Then, the capacitor will be commenced to be again charged.

As previously pointed out, the inductor may be dispensed with provided that the rectifier device 5 will have the inherent capacitance very smaller as compared with the capacitor 1.

Fig. 3 shows capacitor-charging characteristic curves. As illustrated by a straight line portion $P_1$ of a curve A, the capacitor 1 is linearly charged up to a voltage slightly lower than a predetermined voltage $V_0$ during a period of time of $t_1$. This charging is rapidly effected. At this time, the voltage across the capacitor 1 will approach to the output voltage from the rectifier device 5 and the current for charging the capacitor will greatly be reduced. Therefore, the rectifier device 5 will have a forward resistance largely increased because of its rectifying characteristic. This large increase in the forward resistance of the rectifier device 5 can reduce the charging rate as shown by the portion $P_2$ of the curve A in Fig. 3. Thus the capacitor 1 will be charged to the voltage $V_0$ and then discharged. Accordingly it will be seen that the capacitor 11 is alternately subjected to charging and discharging and that the workpiece 3 is electrically machined by the discharged current.

If the capacitor would be charged through a suitable resistor rather than through the inductor described above, or if an R-C network would be used to charge the capacitor a voltage across the same will exponentially be increased and asymptotically approach to the predetermined value $V_0$ as illustrated by a curve B in Fig. 3. Accordingly, a period of time necessary for charging the capacitor to a voltage very close to the voltage $V_0$ will be very greater as compared with the L-C network of the invention. In other words, the provision of the inductor 4 is possible to reduce extremely the capacitor-charging period thereby to increase greatly the rate of repetition of electric discharge. This results in increase in the speed at which the workpiece can be machined.

Since the capacitor may be very rapidly charged to the predetermined voltage $V_0$, the electric energy stored in the same during each of the charging periods will be substantially equal irrespective of the rate of repetition of electric discharge and hence the electric energy serving to machine the workpiece will be substantially equal every time. Also the utilization of the output from the rectifier device will be maximum because the predetermined voltage $V_0$ is closed to the output voltage from the rectifier device shown by a dotted line parallel to the time axis.

As previously described, the control winding 11 of the saturable reactors 6 is connected between the workpiece 3 and that output terminal of the rectifier device 5 remote from the inductor 4. In operation, the machining current flowing through the spark gap is also passed to the control winding 11 to excite the reactors 6. Since the winding 11 is wound on the reactor cores to establish magnetic flux in the same in the opposite direction as does the bias winding 10, the current flowing through the winding 11 tends to reduce the numbers of lines of magnetic induction in the cores. Therefore, the impedance presented to the alternating current flowing through each of the alternating current windings 9 will be increased and the alternating voltage across the same also increased. This increase will reduce the output voltage from the rectifier device 5 and consequently the machining voltage across the spark gap. However, these reductions may be very small because as previously mentioned, the saturable reactors are designed to remain substantially in their saturated states before the machining current will reach a certain value $I_1$ which will be explained hereinafter. Accordingly the machining voltage may be decreased from its initial value $V_0$ to a value $V_1$ corresponding to said value $I_1$ of the machining current as illustrated in Fig. 4a.

The decrease in the length of the spark gap will increase the machining current flowing through the gap. This increase in the current will make the rate of repetition of electric discharge higher. The saturable reactors 6 are arranged to be free from their magnetic saturation provided that the control winding 11 has a unidirectional current flowing therethrough substantially equal to the above-mentioned value $I_1$, at which or in the vicinity which the electro-machining is normally effected. Therefore, if the machining current will exceed the value $I_1$ the impedance presented to the alternating current flowing through each of the alternating current windings 9 will suddenly be increased whereby the machining voltage will rapidly drop. Since the charging voltage is reduced during this period of operation the capacitor-charging rate may not be varied. Alternatively, the rate may be reduced by virtue of increase in the forward resistance of the rectifier device 5, and the rate of repetition of electric discharge may not be increased. Thus, it will be seen that any variation in the machining voltage causes the machining current to be very slightly changed whereby the produced discharge can be prevented from being converted into an arc discharge.

If the spark gap would be short-circuited for any reason the machining current will be increased. However, this increased current is passed through the control winding 10 of the saturable reactors 6 to produce magnetic fluxes in the reactor cores in the opposite sense to those produced by the bias winding 10. Therefore, the impedances of the reactors 6 are increased thereby to reduce the output voltage from the rectifier device 5. Thus the short-circuited current will be prevented from being increased and may be limited to a value $I_0$ substantially equal to or slightly higher than the value $I_1$ as illustrated in Fig. 4a. In the prior art apparatus, the short-circuited current may amount to approximately twice the value $I_1$.

It is apparent that the automatic voltage control system described above can control the discharge characteristic of the spark gap in such a manner that the ratio of variation in the voltage across the gap to variation in the current flowing therethrough is small before the current will reach the normal value $I_1$ of the machining current whereas the ratio is large after the current will exceed the value $I_1$ with the short-circuited current, if present, limited to a magnitude substantially equal to or slightly exceeding the value I. Therefore, the rate of repetition of electric discharge can be increased without a danger of converting the machining discharge into the arc discharge. This is the remarkable feature of the invention over the known apparatus using R–C or L–R–C networks in which the rate of repetition of electric discharge is varied by changing the machining voltage.

Referring now to Fig. 2, there is shown a modification of the invention, but a machining unit is schematically illustrated by an electrode-tool and a workpiece placed in a vessel. Similar reference numerals are used in that figure to indicate components corresponding to those in Fig. 1. In the following description, reference will only be made to the distinctive feature of the modification. It will be understood that, instead of being connected between the source 8 of single phase alternating current 8 and a primary winding of an insulating transformer 7 a saturable reactor 6 may be connected between a secondary winding of the transformer and a rectifier device 5 of bridge type.

In the arrangement illustrated, the saturable reactor 6 comprises a bias winding 10 adapted to be fed from the rectifier device 5 and is initially brought into suitably magnetized state by adjusting a variable resistor 13 connected between the winding 10 and the rectifier device 5 for the same purpose as described in conjunction with Fig. 1. It is noted that the magnetic state of the reactor 6 and hence its impedance may be varied in accordance with currents flowing through both bias winding 10 and a control winding 11.

In operation, a machining current flowing through a spark gap between the workpiece 3 and the electrode-tool 2 is successively increased as the gap is decreased in length. As similar in the previous embodiment, a machining voltage across the spark gap will be somewhat varied in accordance with a machining current until the gap will have a length corresponding to that value of the machining current slightly exceeding its normal value $I_1$. Then, a further increase in the machining current will largely increase the impedance of the saturable reactor 6 thereby to reduce greatly the output voltage from the rectifier device 5. This reduction in the voltage will decrease an exciting current flowing through the bias winding 10. Since, as in the arrangement shown in Fig. 1, the bias winding 10 excites magnetically the saturable reactor 6 in the opposite direction as does the control winding 11 the decrease in the current flowing through the winding 10 can increase the impedance of the reactor 6 more largely. Thus, the impedance will be maximum when the spark gap will be short-circuited. It will, therefore, be seen that the voltage-to-current characteristic of the spark gap is represented by a curve shown in Fig. 4b, and that the short-circuited current is limited to a value $I_0'$ which is substantially smaller than the normal value $I_1$ of the machining current. With the spark gap short-circuited, the reactor core will be excited only by the short-circuited current but in the opposite sense to that excited initially by the winding 10. However, this excitation will merely increase the impedance of the saturable reactor to a negligible extent because the short-circuited current is low and because the ratio of numbers of turns of the winding 11 to the winding 10 is very small.

In order to compare the embodiments of the invention with the prior art apparatus, tested results obtained by using the invention and the apparatus respectively are represented in the following table. In the tests, roughness of machined surfaces of workpieces in both cases was maintained at the maximum value of 2 microns.

|  | Roughness of machined surface (H max. μ) | machining speed (g./min.) | Rate of repetition of electric discharge (c./sec.) |
| --- | --- | --- | --- |
| The arrangements of the invention | 2 | 0.023 | about $1.5 \times 16^6$ |
| The prior art apparatus (L–R–C network) | 2 | 0.003 | $1.2 \times 10^6$ |

While the invention has been described in conjunction with several embodiments thereof, it is to be understood that various modifications and variations can be carried out without departing from the spirit and scope of the invention. Instead of the saturable reactor previously described, other suitable variable impedance means may be used in practicing the invention. Such means may comprise an electrolytic capacitor of liquid type for alternating current having a variable impedance, an electron discharge device or the like.

Referring to Fig. 5, there is shown another modification of the invention illustrating only such an electrolytic capacitor and its associated components. A source of alternating current 8 is connected to a primary winding of an insulating transformer 7 through an electrolytic capacitor for alternating current indicated generally by a reference numeral 30 which has a variable impedance. The transformer 7 includes a secondary winding connected across a rectifier device such as that shown in Fig. 2. The capacitance of the electrolytic capacitor 30 may be varied by changing that area of its electrode unit in contact with an electrolyte of the capacitor by the action of an electromagnet illustrated schematically by a winding 31. For this purpose, the winding 31 may be connected through a variable resistor 13 across a machining capacitor (not shown) for supplying electric energy to a spark gap between an electrode-tool and a work-piece. Accordingly, the winding is fed from the machining capacitor and the adjustment of the variable resistor 13 can control a current flowing through the winding 30 thereby to set the initial capacitance or impedance of the electrolytic capacitor 30 as in the arrangements shown in Figs. 1 and 2. It will, therefore, be appreciated that, in operation, the capacitance or impedance of the capacitor 30 may be controlled by a machining voltage and/or a machining current in the similar manner as in the arrangement shown in Fig. 2.

Fig. 6 shows a further modification of the invention employing electron discharge devices for automatically controlling a voltage with which a machining capacitor is charged. One of a pair of electron discharge devices of the same type such as 32 includes an anode connected to one terminal of a source of alternating current 8, a control electrode connected to one end of a primary winding of a compensating transformer 34 and a cathode connected to one end of a secondary winding of the same. Similarly, the other device 33 includes an anode connected to one end of a primary winding of an insulating transformer 7, a control electrode connected to the other end of the primary winding of the compensating transformer 34, and a cathode connected to the other end of the secondary of the transformer 34. The anode of the device 32 is connected to the cathode of the device 33 while the anode of the latter is connected to the cathode of the former. The other terminal of the source 8 is connected to the other end of the primary of the transformer 7 which, in turn, has a secondary winding connected across a rectifier device as illustrated in Fig. 2. The primary of the transformer 34 has a center tap connected to one terminal of a machining capacitor through a bias source 35 having a voltage and the secondary of the same has a center tap connected directly to the other side of the machining capacitor. A shunt resistor is connected across the machining capacitor and has a high resistance presenting substantially no effect upon electric discharge between a workpiece and an electrode-tool.

If both the electron discharge devices will be conductive, the positive half cycle of alternating current from the source 8 will be passed through the one device 32 to the insulating transformer 7 and the negative half cycle passed through the other device 33 to the transformer 7. As in the arrangement described previously, the impedance presented to the alternating current passed through each of the electron discharge devices 32 and 33 may initially be set by adjusting the voltage of the bias source 35 and may be increased as a machining voltage is decreased. The compensating transformer 34 serves to compensate for alternating voltage effect on the control electrode of each of the electron discharge devices.

It will be understood that any desired number of electron discharge devices can be used for supplying an alternating current required for electrically machining a workpiece. Also, semiconductor devices may be used as variable impedance means.

From the foregoing it will be apparent that the invention can electrically machine a workpiece to be machined at a machining current having its normal value or slightly exceeding the same and an extremely high rate. Therefore, the invention is particularly applicable to subject the workpiece to finish machining in which the machining current is relatively critical.

What I claim is:

1. An electric spark machining apparatus having a tool electrode operable into engagement with a workpiece and to operative positions in which it is spaced from the workpiece forming a spark gap between it and the workpiece, in combination, a capacitor, electrical connections connecting the capacitor to the workpiece and the tool electrode thereby to connect the capacitor across said gap, a charging circuit including rectifier means having a unidirectional output connected to said capacitor for charging the capacitor in successive periods such that intermittent electrical discharge will occur across said gap, input circuit means for applying an alternating voltage to said rectifier means, said electrical connections including impedance means having an impedance just sufficient to preclude application of a charge of electrical energy to said capacitor at the start of each successive period corresponding in value to an inherent capacitance value level of said rectifier means, control means operatively connected to said input circuit means and operable automatically for controlling charging characteristics of the capacitor in dependence upon the length of the gap between the tool electrode and the workpiece and for maintaining said characteristics such that a short-circuiting current occurring on short-circuiting of the gap will not substantially exceed a selected normal working current flowing through said electrical connections.

2. An electric spark machining apparatus according to claim 1, in which said control means comprises saturable reactor means having a first control winding for controlling the initial impedance of said reactor means and a second control winding in series with said charging circuit to control the operating impedance of said reactor means in dependence upon the length of said gap, said two windings being arranged on said reactor means to magnetically excite the saturable reactor means in opposition to each other, and direct current means including a variable resistance for energizing said first control winding.

3. An electric spark machining apparatus according to claim 1, in which said control means comprises saturable reactor means having a first control winding connected across the direct current output of said rectifier means to control the initial impedance of said reactor means and a second control winding in series circuit relationship with said charging circuit to control the operating impedance of said saturable reactor means in dependence upon the length of said gap, said two control windings being arranged on said reactor means to magnetically excite the saturable reactor means in opposition to each other.

4. An electric spark machining apparatus according to claim 1, in which said control means comprises variable capacitance means, means operatively connecting the variable capacitance means with said rectifier means, an exciting winding inductively coupled to said variable capacitor and electrically connected to the first mentioned capacitor, variable impedance means electrically connected to said exciting winding for adjustably setting the initial capacitance of said variable capacitance means.

5. An electric spark machining according to claim 1, in which said input means comprises a source of alternating current, and in which said control means comprises a pair of electrically connected electron discharge devices operatively connected between said alternating current source and said rectifier means, means for adjustably initially setting an impedance level presented to the alternating current applied to said rectifier means, electrical connections between said means for setting said impedance level and said capacitor.

References Cited in the file of this patent

UNITED STATES PATENTS

| | | |
|---|---|---|
| 2,365,611 | White | Dec. 19, 1944 |
| 2,804,575 | Matulaitis | Aug. 27, 1957 |
| 2,807,753 | Steinitz | Sept. 24, 1957 |
| 2,807,754 | Steinitz | Sept. 24, 1957 |